United States Patent
Brien et al.

(10) Patent No.: US 6,265,851 B1
(45) Date of Patent: Jul. 24, 2001

(54) ULTRACAPACITOR POWER SUPPLY FOR AN ELECTRIC VEHICLE

(75) Inventors: Richard M. Brien, Methuen; Mitchell Weiss, Carlisle, both of MA (US)

(73) Assignee: PRI Automation, Inc., Billerica, MA (US)

(*) Notice: Subject to any disclaimer, the term of this patent is extended or adjusted under 35 U.S.C. 154(b) by 0 days.

(21) Appl. No.: 09/591,771

(22) Filed: Jun. 12, 2000

Related U.S. Application Data

(60) Provisional application No. 60/138,714, filed on Jun. 11, 1999.

(51) Int. Cl.[7] .......................................... H02J 7/04
(52) U.S. Cl. ............................... 320/162; 320/137
(58) Field of Search ........................ 320/162, 137, 320/104, 103; 363/155, 131, 132

(56) References Cited

U.S. PATENT DOCUMENTS

| 5,260,637 | * | 11/1993 | Pizzi | 320/150 |
| 5,373,195 | | 12/1994 | De Doncker et al. | 307/45 |
| 5,710,699 | | 1/1998 | King et al. | 363/132 |
| 5,723,956 | * | 3/1998 | King et al. | 323/230 |
| 5,734,258 | | 3/1998 | Esser | 323/224 |
| 5,952,815 | * | 9/1999 | Rouillard et al. | 320/162 |

* cited by examiner

Primary Examiner—Peter S. Wong
Assistant Examiner—Lawrence Luk
(74) Attorney, Agent, or Firm—Weingarten, Schurgin, Gagnebin & Hayes LLP

(57) ABSTRACT

An ultracapacitor power supply for an electric vehicle is provided which employs an ultracapacitor as the primary power source and a battery as a supplemental power source. This vehicle is particularly effective in power-rail system having gaps in the power-rail or in non-power rail systems having recharging stations positioned along the track The ultracapacitor recharges quickly upon vehicle passage over a live power rail or entry into a recharging station. Optimum performance is achieved when the capacitor is allowed to fully recharge. The battery need only provide power when the ultracapacitor has been discharged or during acceleration or other periods of peak power consumption, thereby reducing the number of battery recharges required during any given operational period.

21 Claims, 8 Drawing Sheets

ULTRACAPACITOR POWER SUPPLY FOR AN ELECTRIC VEHICLE

CROSS REFERENCE TO RELATED APPLICATIONS

This application claims priority under 35 U.S.C. §119(e) to provisional patent application serial No. 60/138,714 filed Jun. 11, 1999; the disclosure of which is incorporated by reference.

STATEMENT REGARDING FEDERALLY SPONSORED RESEARCH OR DEVELOPMENT

N/A

FIELD OF THE INVENTION

This invention relates to materials transport systems and, more particularly, to the use of ultracapacitors as the primary power source for electric vehicles used in such systems for moving semiconductor wafers or other materials to various locations along a track.

BACKGROUND OF THE INVENTION

Computer controlled materials transport systems are known for moving materials among various work stations of a facility. Such systems are employed, as an example, in semiconductor fabrication facilities for moving semiconductor wafers to successive work stations. In such a wafer transport system, a monorail track is routed past the various work stations and a plurality of electric vehicles are mounted on the track. The plurality of electric vehicles are moveable along the monorail track for delivering wafers to the successive work stations for processing, and for removing wafers therefrom after the requisite processing operations are completed. The track is composed of interconnected track sections which usually include one or more routing sections or modules which are operative to provide plural paths along the track.

Each vehicle includes one or more electric motors coupled to drive wheels which in turn engage the track for propelling the vehicle along the track. Electronic circuitry governed by an on board micro-controller controls operation of the vehicle in response to control signals provided from one or more central control points within the facility. It is not always possible, or desirable, to directly power the vehicle via a power rail or similar means. Therefore, a battery or battery pack is usually contained on board the vehicle for powering the motors and associated circuitry for at least a portion of vehicle operation. An ultracapacitor may also be contained on board as a supplemental power source to supply additional power during peak consumption periods. A materials transport system used for semiconductor wafer transport and other materials is described in U.S. Pat. No. 4,926,753, assigned to the same Assignee as the present invention.

Due to the power demands of an electric vehicle, the battery must be frequently recharged through either a mechanical electrical connection or inductive coupling of magnetic fields at recharging stations located at predetermined positions along the track as described in U.S. patent application and assigned to the same Assignee as the present invention. However, the batteries used to power these vehicles can be recharged only a specified number of times before they reach the end of their life cycle. In general, the life cycle of a rechargeable battery is less than that of the vehicle in which they are installed in. Because each battery replacement increases the cost of operating an electric vehicle, the cost associated with each vehicle must be increased to account for the eventual replacement of the rechargeable batteries used in it. In addition, certain types of batteries require periodic deep discharges to prevent the batteries from developing a charge "memory" that may limit the ability of the rechargeable battery to fully charge. Having to deeply discharge a battery in a vehicle being used runs the risk of stranding the vehicle without power, possibly resulting in a system blockage. This can result in a decrease in the efficient use of an electric vehicle as well.

Therefore, what is needed is a method and system that decreases the reliance of an electric vehicle on power that is supplied by a rechargeable battery by reducing the number of battery charge/discharge cycles required during a given period of vehicle operation, so as to extend the battery life.

BRIEF SUMMARY OF THE INVENTION

In accordance with the invention, an unltracapacitor power supply for an electric vehicle is provided which employs an ultracapacitor as the primary power source and a battery as a supplemental power source. This vehicle is particularly effective in power rail system having gaps in the power-rail or in non-power-rail systems having recharging stations positioned along the track The ultracapacitor recharges quickly upon vehicle passage over a live power rail or entry into a recharging station, and optimum performance is achieved when the capacitor is allowed to fully recharge. The battery then needs only provide power when the ultracapacitor has been discharged or during acceleration or other periods of peak power consumption, thereby reducing the number of battery recharges required during any given operational period.

A current surge limiter or constant current circuit may be inserted between the recharging power source and the ultracapacitor to avoid damage to the ultracapacitor or overload of the recharging power source. The current surge limiter may be an active current surge limiter. Furthermore, a cell voltage equalizer for limiting the charge voltage may be placed across each individual cell of an ultracapacitor assembly to extend the assembly lifetime. The cell voltage equalizer may include an overvoltage detector to detect any cell whose voltage has risen above a predetermined threshold level and a reporting mechanism to identify any such occurrence.

DETAILED DESCRIPTION OF THE INVENTION

Figure 1:
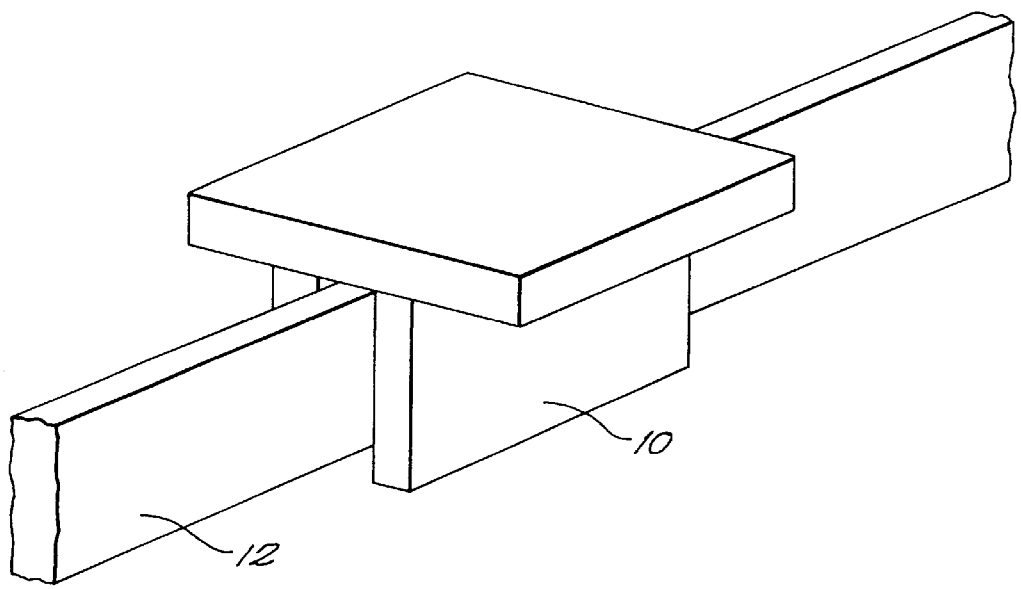
FIG. 1 is a pictorial view illustrating a monorail track and an electric vehicle incorporating the invention.

An electric vehicle 10 incorporating the invention and a portion of a monorail track 12 upon which it rides is illustrated in FIG. 1. The vehicle 10 may be used, for example, in a wafer handling system to transport wafer cassettes containing semiconductor wafers between stations in a semiconductor manufacturing facility. The track 12 is disposed along one or more predetermined pathways and may have several such vehicles riding on the track. The track 12 is usually composed of a plurality of modular sections which are interconnected by routing modules which are operative to interconnect track sections to provide flexible and efficient routing of the vehicles along desired paths. The track 12 may include a power rail (not shown) connected to a system power supply to directly power the vehicle 10, except when gaps in the rail are encountered and the vehicle 10 must rely on internal power. In another embodiment the vehicle may be self-powered relying for power upon an onboard power supply, which preferably is rechargeable and contains a sufficiently high energy density to power the electric vehicle between recharging stations (not shown).

Figure 2:
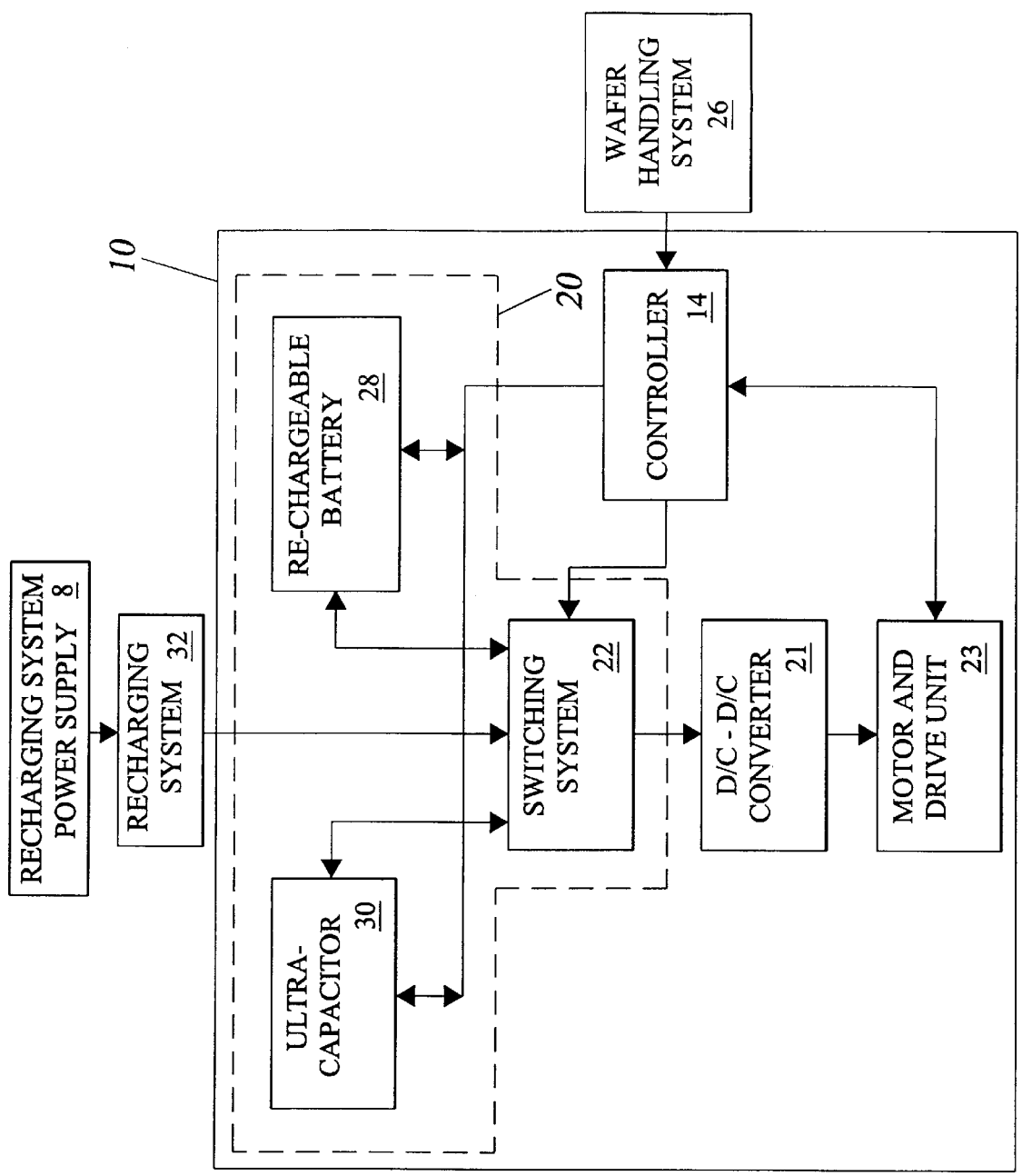
FIG. 2 is a block diagram of a power supply for an electrical vehicle having an ultracapacitor as a primary power source and a battery as a secondary power source.

Referring to FIG. 2, a power supply 20 is disposed on, or within, the vehicle 10 and comprises a primary ultracapacitor power source 30 and a secondary power source 28 that may be a battery, or a second ultracapacitor coupled via a switching circuit 22 to an engine and drive unit 23. Optionally, a DC-DC converter 24 may be used and disposed between the switching system 22 and the engine and drive unit 23. A controller 14 is coupled to the engine and drive unit 23, the primary and secondary power sources 30 and 28, and switching system 22. The controller 14 monitors the voltage and current from the primary and secondary power sources, and controls the switching device 22 to select either one, or both, of the primary and secondary power sources for supplying the necessary power for the vehicle 10 to operate. In addition, the controller is responsive to control signals provided by the track system controller 26 with regard to the control and motion of the vehicle 10. The micro-controller 14 may be an embedded microprocessor device, such as the Pentium® III™ microprocessor available from Intel Corporation, of Santa Clara, California. The switching circuit 22 typically comprises an array of switching elements (not shown) controlled by the controller 14. Recharging system 32 receives power from recharging system power supply 8 and provides the current necessary to recharge the primary and secondary power sources. As will be explained in more detail below, the recharging system 32 includes two parts: a recharging station part and an onboard vehicle part. The two parts of the recharging system 32 cooperate to transfer power from the recharging station to the onboard vehicle to recharge the primary and secondary power sources and, in one embodiment, power the electric vehicle.

Figure 3:
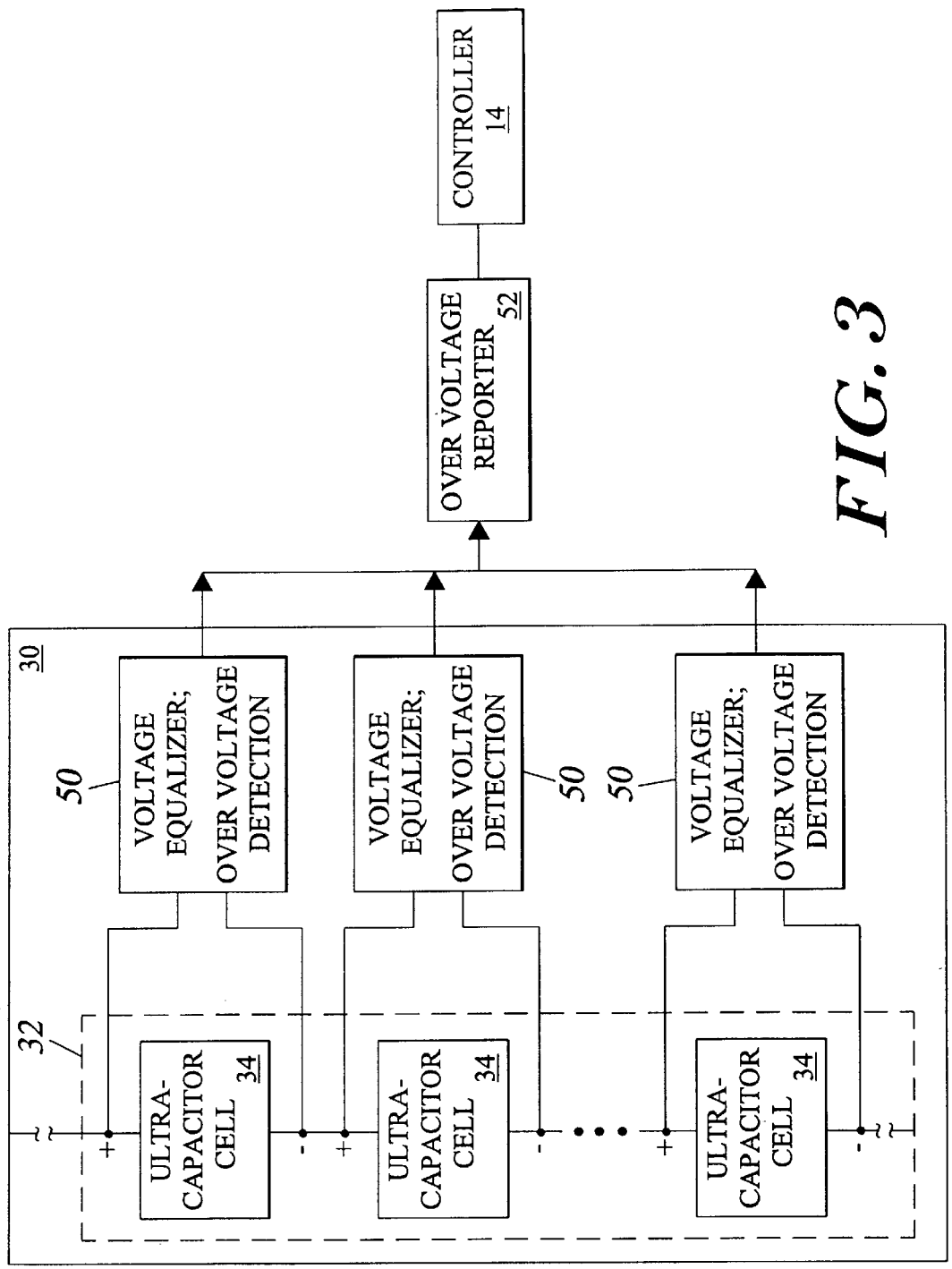
FIG. 3 is a block diagram of the primary power source of the power supply of FIG. 2.

The primary ultracapacitor power source 30 is illustrated in FIG. 3 and comprises an ultracapacitor assembly 32 having a plurality of ultracapacitor cells 34 electrically coupled together to supply sufficient voltage and current to operate the electric vehicle. Each ultracapacitor cell 34 may also includes a cell voltage equalizer and over-voltage detection system 50 connected across the voltage terminals of each ultracapacitor cell 34. As will be described below, the cell voltage equalizer 50 prevents the recharging voltage applied to the ultracapacitor cells 34 from exceeding a specified maximum cell voltage during the recharging operation. In addition, each cell 34 may include an over-voltage detection system incorporated with the cell voltage equalizer to detect an over-voltage condition occurring on any of the ultracapacitor cells 34. An over-voltage signal is generated by the over-voltage detection system and supplied to the over-voltage reporter system 52. The over-voltage reporter system 52 provides a signal to the controller 14. In one embodiment, the over-voltage signal may include an LED that illuminates when an over-voltage condition is detected the over-voltage detection system. A photo-sensor that can be monitored by the controller 14 may be used to detect the illumination from any of the plurality of LEDs. In this way, an over-voltage condition on any ultracapacitor cell 34 will trigger the photo-sensor and alert the controller 14. In another embodiment the over-voltage detection system may provide a logic signal to an OR logic gate that can generate an output signal when any ultracapacitor cell 34 indicates that an over-voltage condition exists. The signal from the logic OR gate can be monitored by the controller 14. Upon receipt of the overvoltage signal, the controller 14 can take appropriate action to prevent the over-voltage condition from damaging the ultracapacitor cells 34.

Figure 4A:
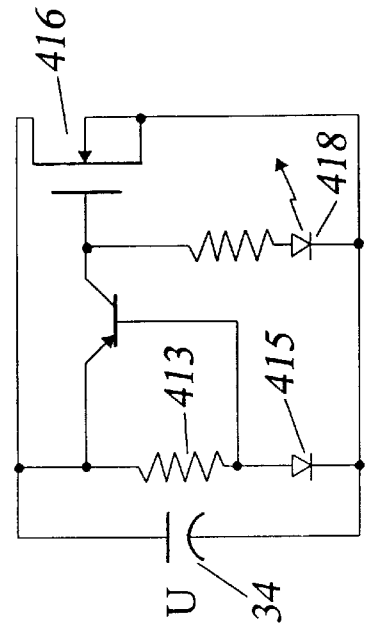
FIGS. 4–4C are schematic diagrams of three embodiments of the cell voltage equalizer circuit of the primary power source of FIG. 3.
Figure 4B:
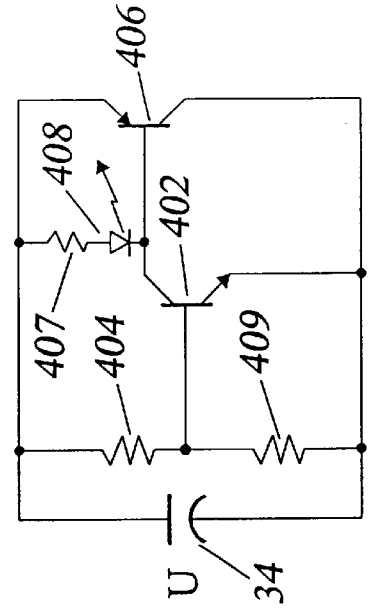
Figure 4C:
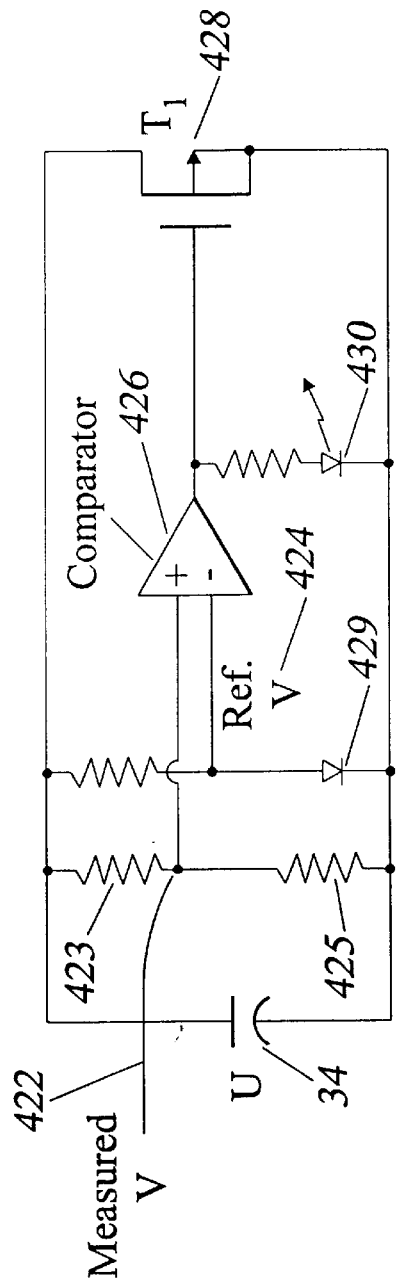

Three different embodiments of the cell voltage equalizer 50 are illustrated in FIGS. 4A–4C. Referring to FIG. 4A, a voltage across the ultracapacitor cell 34 that is sampled by resistors 404 and 409 and that exceeds the turn-on voltage of NPN bipolar transistor 402, switches the transistor 402 "on". This allows current to pass through the transistor 402 and hence current to flow through a light emitting diode (LED) 408 causing it to illuminate. The voltage drop across the LED 408 and resistor 407 will turn "on" the PNP bipolar transistor 406. This allows current to flow through transistor 406 discharging the ultracapacitor cell 34 through the transistor 406. After the ultracapacitor cell 34 has discharged sufficiently such that the voltage across it falls below the turn "on" voltage of transistor 402, transistor 402 will turn "off", and not allow current to flow through it. This in turn will turn "off" the LED 408 and transistor 406 as well.

Similarly, in FIG. 4B, an over-voltage condition on an ultracapacitor cell will switch PNP transistor 414 "on". This will allow current to flow through transistor 414 causing the LED 418 to illuminate and to turn "on" an n-channel field effect transistor 416. Turing "on" transistor 416 allows current to flow through the transistor 416 discharging the ultracapacitor cell 34. When the voltage across the ultracapacitor cell 34 falls below the over-voltage condition, transistor 414 turns "off" preventing current from flowing and turning off the illumination from LED 418 and turning off transistor 416.

Finally, in FIG. 4C, a comparator 426 switches "on" when an over-voltage condition occurs. The comparator 426 compares a voltage sampled from the ultracapacitor cell 34 to a reference voltage set by resistor 427 and diode 429. When the comparator 426 senses the measured voltage 422 exceeds the reference voltage 424, the comparator switches to a high output. This allows current to flow through LED 430 causing it to illuminate, and enables a p-channel field effect transistor 428 to turn-on and discharge the ultracapacitor cell 34. In all three embodiments, a photo sensor may be used to detect the illuminated LED. As discussed above, the photo sensor may be monitored by the controller 14 such that the over-voltage condition exists on an ultracapacitor cell 34 is thereby reported. Those skilled in the art will recognize that there are a variety of other mechanisms available for reporting a faulty cell to the micro-controller 14, including the OR logic gate discussed above.

The secondary power source 28 can be a rechargeable battery pack. Preferably the battery pack is not of a type requiring a periodic deep discharge. As discussed above a battery that does not require a deep periodic discharge may be kept close to full charge and thereby reduce the possibility of the vehicle 10 becoming stranded on the track 12 without power. Alternatively, a second ultracapacitor may be used as the secondary power source 28

Both the ultracapacitor 30 and the rechargeable battery 28 are finite storage devices that discharge with vehicle use and, therefore, require periodic recharging to restore their charges. A recharging system 32 can be used to assure that both the ultracapacitor 30 and the rechargeable battery 28 are charged with sufficient power to move the electric vehicle to the next recharging station.

As discussed above, there are primarily two methods of providing power to an electric vehicle in a material handling system: a vehicle system that includes an onboard self-contained power supply, a "self-powered system"; and a vehicle system in which the vehicle receives power from a power rail system adjacent to the track, a "power rail system". In a self powered system, one or more intermittent recharging stations may be positioned along the track 2 where, under predetermined conditions, an electric vehicle may stop to recharge the primary and secondary power sources. A recharging function may also be incorporated into a portion of, or all of, the work stations, where the electric vehicle may deliver or remove wafers. As used herein, a recharging station or a recharging function performed at a workstation are both referred to generically as a recharging system.

The intermittent recharging system 32 is powered by a recharging system power supply 8 and is preferably spaced close enough together so that the ultracapacitor assembly 32 does not completely discharge before reaching the next station. Should the ultracapacitor assembly fully discharge the power will be supplied by the secondary power source. The controller 14 may command a recharging as a regularly scheduled stop, at a work station or at a recharging station, and/or upon the detection of a low charge condition. Ideally, both the primary ultracapacitor power source 30 and the secondary rechargeable battery power source 28 are recharged to their full capacity before the vehicle 10 exits the station and continues on its route.

In a power rail system, the power rail directly powers the electric vehicle. In this system the primary ultracapacitor power source and the secondary rechargeable battery power source are utilized to provide power only where there are gaps in the power rail and the electric vehicle must rely on internal power. In this system, the recharging function occurs during the time that the electric vehicle is in contact with the power rail. Recharging is less frequent than in a rail powered system because the ultracapacitor assembly 32 need only provide power when the vehicle passes over gaps in the rail, which are preferably of short distance so that the ultracapacitor does not completely discharge. As used herein, the recharging function of the power rail system will also be subsumed within the term recharging system.

Figure 5:
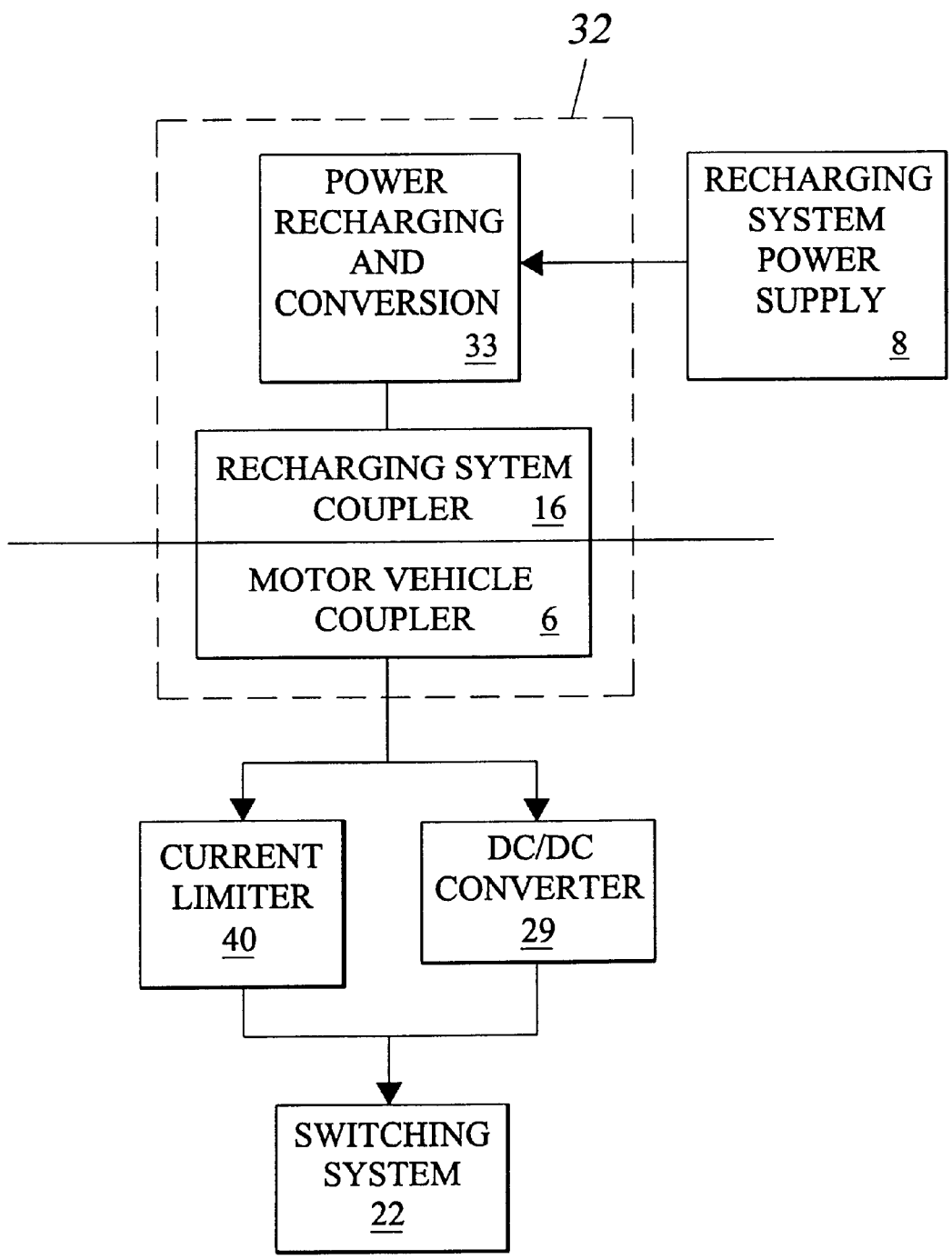
FIG. 5 is a block diagram of the recharging system.

One embodiment of a recharging system 32 is illustrated in FIG. 5. The power conditioning and conversion system 33 receives power from a recharging system power supply 8. The reconditioned and converted power is provided to a recharging system coupler 16 that is configured and arranged to provide electrical power transfer to the motor vehicle coupler 6. As will be explained below, there may be either a direct electrical connection between the two couplers or the couplers may be inductively coupled together. The power that is received by the motor vehicle coupler 6 is provided to an active current surge limiter 40 discussed in detail below, and may optionally include a second DC-to-DC converter 24 placed across the active current surge limiter 40. In another embodiment, a passive current surge limiter may be used. This parallel combination may be used to maintain a constant charging current until the ultracapacitor is within approximately 1 or 2 volts of the full charge voltage. The charging current provided by the current limiting system and the DC-DC converter may be provided to the switching circuit 22 for distribution under the control of controller 14.

The recharge system coupler 16 and electric vehicle coupler 6 are configured and arranged to provide a transfer of power from the recharging system to the electric vehicle that is sufficient at least recharge the primary and secondary power sources and in one embodiment, power the electric vehicle as well. The power transfer typically is either a direct electrical connection or may be inductively transferred.

In a direct electrical connection the motor vehicle coupler 6 may include one or more pair of electrically conductive brushes or connectors that are operative for maintaining a continuous electrical connection with a power rail or other electrical supply connector.

Figure 6:
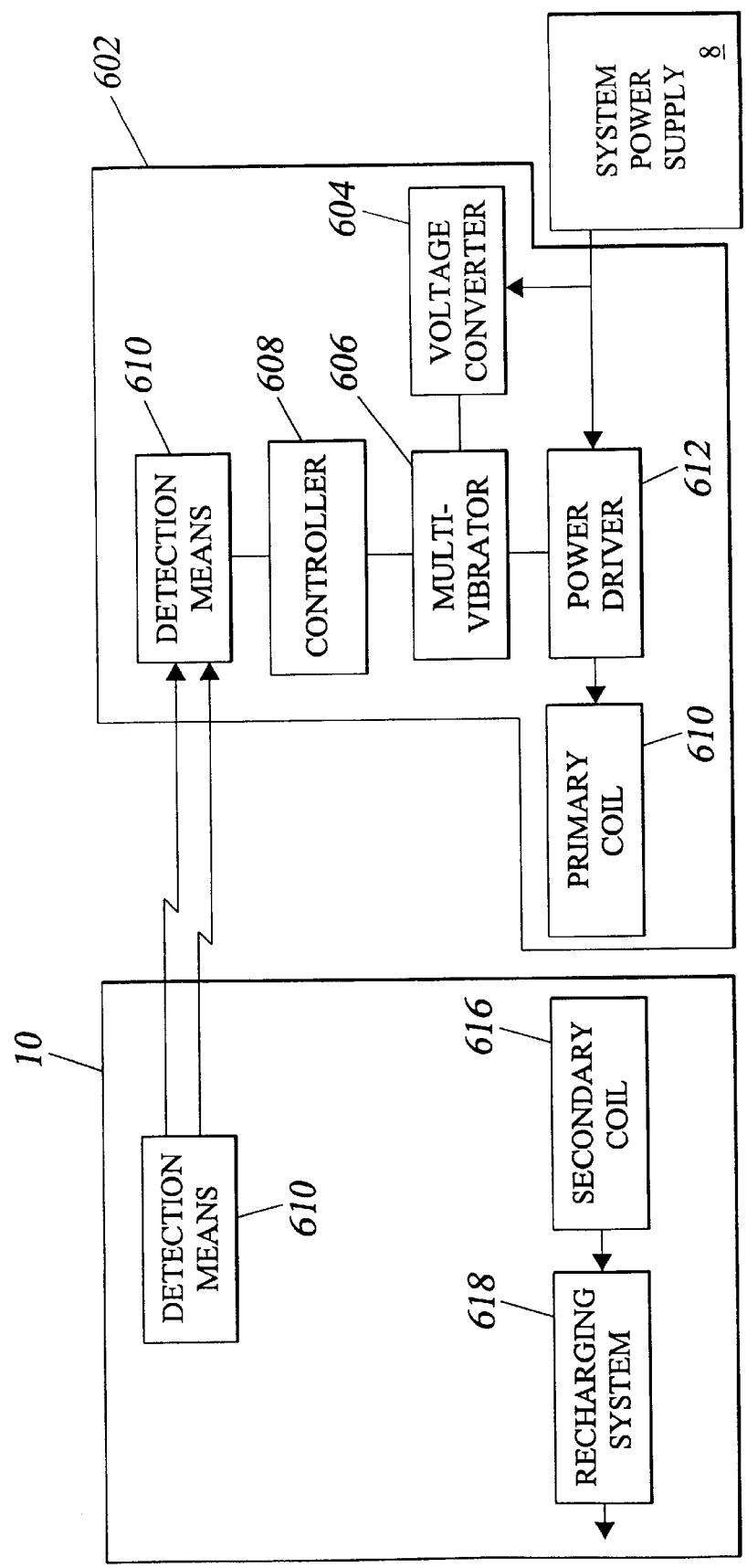
FIG. 6 is a block diagram of an inductively coupled power supply connection to the recharging system.

In an inductively coupled system, which may include both a power rail system or a recharging system, inductively coupled power is transferred between a primary coil located on the recharging system and a secondary coil located on the electric vehicle. One embodiment of an inductively coupled power transfer system is illustrated in FIG. 6. The recharging system power supply 8 provides power to a voltage converter 604 and a power driver 612. The voltage converter 604 provides voltage and current to the multi-vibrator that converts a direct current waveform into an alternating current waveform that is suitable for use in a transformer system. Primary coil 614 receives the alternating current waveform that has been amplified by power driver 606. A detection means 610 and 620 cooperate to provide a signal indicating that the electric vehicle 10 is present to the controller 608. The controller 608 controls the process of transferring power and prevents a loss of the track system efficiency by ensuring that power is supplied only when the electric car and is present. Primary coil 614 and secondary coil 616 are placed proximate to one another to maximize the inductive transfer of power therebetween. Secondary coil 616 provides the power received from the primary coil 614 to the recharging system 618 for application to the primary and secondary power sources.

Figure 7A:
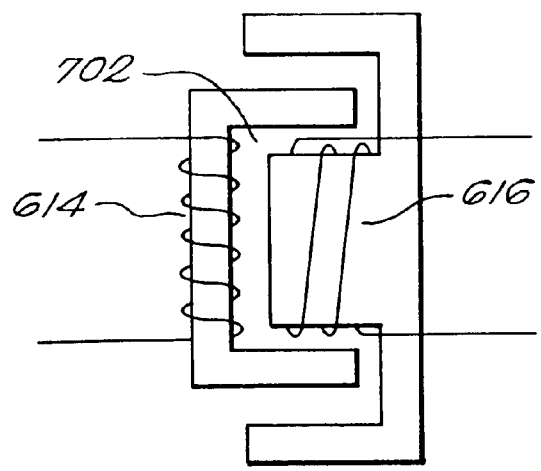
FIGS. 7A and 7B are schematic representations of the inductively coupled power supply connection of FIG. 6.
Figure 7B:
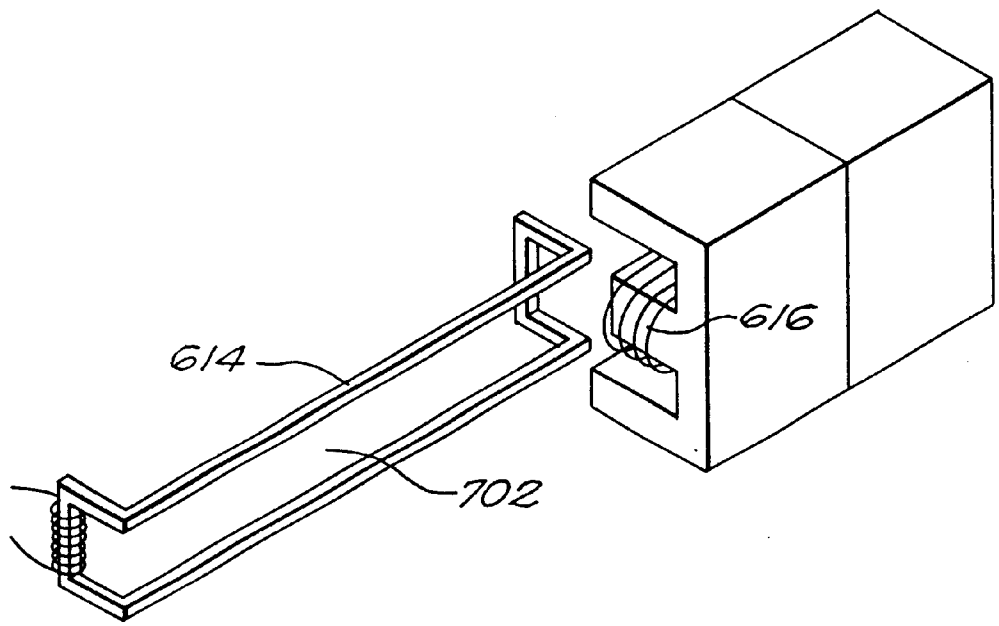

One embodiment of the primary coil 614 and secondary coil 616 is illustrated in FIGS. 7A and 7B. The primary coil 614 may be U-shaped and is disposed along the longitudinal axis of the track. The secondary coil 616 is configured and arranged to pass through the center section 702 of the primary coil for the length of the primary coil allowing magnetic coupling to occur between the two coils. In one embodiment, the secondary coil 616 is E-shaped such that the secondary coil 616 is surrounded by the primary coil 614. The secondary coil may be wound on a ferrite core to enhance the magnetic coupling between the magnetic filed of the primary coil and the secondary coil. Magnetic coupling between the primary and secondary coil induces a voltage and current in the secondary coil that is used to recharge the ultracapacitor and the rechargeable batteries. In addition, for the period of time that the electric vehicle is coupled to the recharging station, the induced secondary voltage and current may be used to operate the electric motor 12 as well.

During the process of recharging the ultracapacitor, the recharging current must be regulated to prevent the ultracapacitor from charging at too fast a rate that may damage the cells and overload the recharging station. Charging at a slow rate, however, may result in an unacceptably long charge period. This may result in an incomplete charge being placed on the ultracapacitor that may result in a loss of system performance or stranding the electric vehicle without power. Accordingly, the active current surge limiter 40, or constant current circuit, is used within the recharging system 4 to provide the proper current to the ultracapacitor 32.

Figure 8:
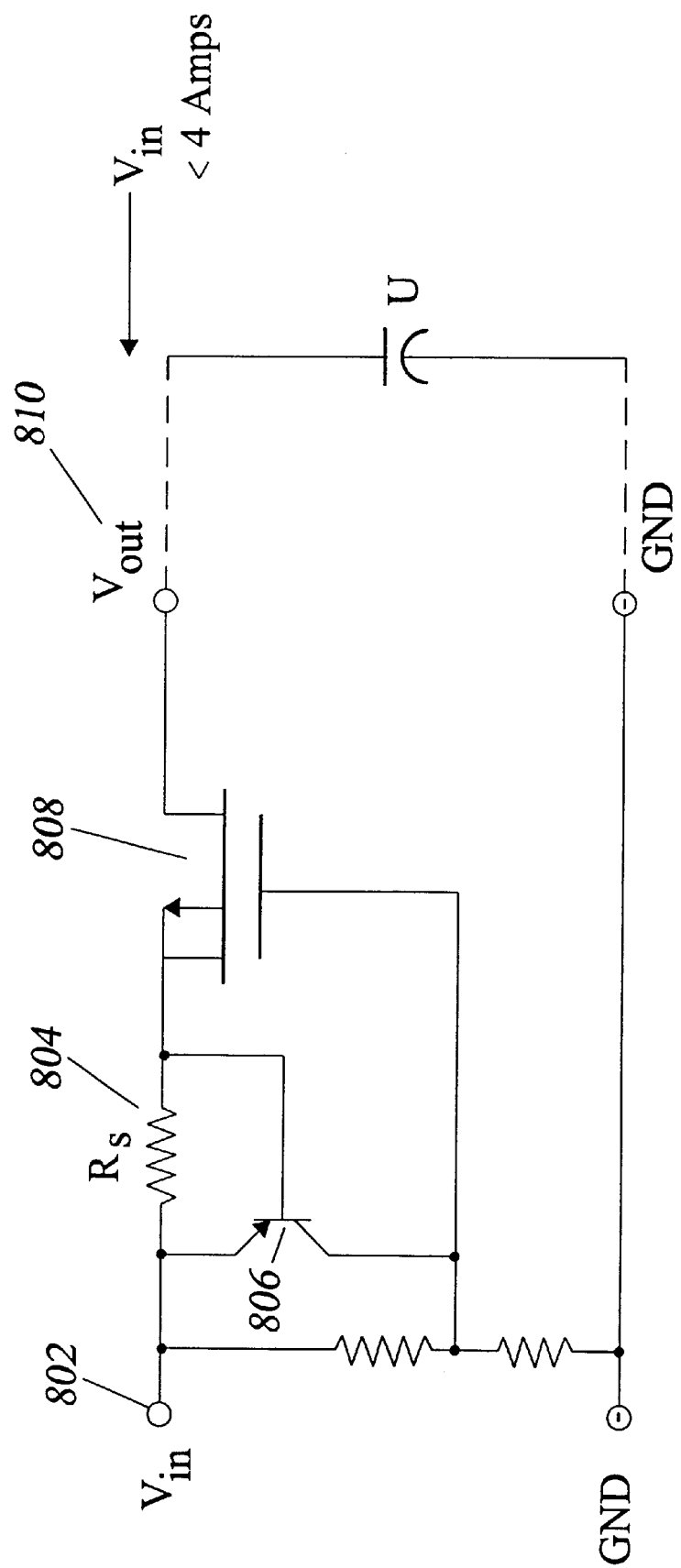
FIG. 8 is a schematic diagram of the current limiting circuit for use in the recharging system of FIG. 5.

One embodiment of the active current surge limiter 40 is illustrated in FIG. 8. When a large potential exists between the input voltage, $V_{in}$ 802, i.e., the recharge voltage, and the output voltage, $V_{out}$ 810, i.e., the ultracapacitor voltage, a charge current flows through the low value series resistor, $R_s$, and a field effect transistor 808. However, if the charge current exceeds a predetermined level, in one embodiment, approximately 3 amps, a bipolar transistor 806 turns "on" to shunt the charging current away from transistor 808 and thereby shut "off" transistor 808. This serves to reduce the charge current through the series resistor, $R_s$, to a value sufficiently low to keep the voltage drop below the transistor 808 turn "on" voltage.

Preferably, the second DC/DC converter 24 is connected in parallel with the active current surge limiter. The DC/DC converter 24 initially converts the high voltage, low current input into a low voltage, high current output to rapidly charge the ultracapacitor at lower voltages when T2 is "off" and the recharge current flowing through the active current surge limiter is low. As the DC/DC converter output voltage increases, the output current begins to fall off, however, as the voltage potential between the input voltage, $V_{in}$, and the output voltage, $V_{out}$, decreases, T1 turns "off" and T2 turns "on" and the active current surge limiter 40 provides the charge current. The charge current flowing into the ultracapacitor cell 34 thus remains essentially constant to within approximately one or two volts of the input voltage, $V_{in}$.

The constant charge current is directed to the primary and secondary power sources via the switching device 22. To achieve the maximum lifetime from an ultracapacitor assembly, the voltage on each and every cell must be maintained below a specified voltage during each recharge cycle. Resistors placed across the cells may equalize the cell voltages after several hours, but can not equalize the cell voltages for the first, or near first, recharge cycles. Working in conjunction with the above-described current surge current limiter 40, the above-described cell voltage equalizer and over-voltage detector system 50 detects an overvoltage condition and reduces the voltage across an ultracapacitor cell 34 to a level below the specified voltage on every recharge cycle, regardless of the charge state of the cell 34. Furthermore, because it is advisable to replace each faulty cell in the assembly, as described above, a mechanism is provided to report the over-voltage condition to the controller 14.

While the invention has been described in relation to a semiconductor wafer handling system, it should be evident that the invention is also useful for other material handling systems in which a vehicle is moveable along a track. Accordingly, the invention is not to be limited by what has been particularly shown and described as variations and alternative implementations will occur to those versed in the art without departing from the spirit and true scope of the invention as represented by the appended claims.

We claim:

1. A power supply for furnishing direct current (DC) power to an electrical vehicle, said power supply mounted on said electrical vehicle and comprising:

a primary ultracapacitor power source generating a primary output voltage and a primary output current used to power the electric vehicle, the primary ultracapacitor power source comprising an ultracapacitor assembly having a plurality of ultracapacitor cells, each of said plurality of ultracapacitor cells holding a charge;

a secondary power source generating a secondary output voltage and a secondary output current used to power the electric vehicle in the event that the charge held by the plurality of ultracapacitor cells in the primary ultracapacitor power source falls below a level necessary to power the electric vehicle;

a switching circuit connected to said primary and secondary power sources and selecting in response to a control signal either or both of said power sources to provide power to said engine;

a controller coupled to the primary power source, the secondary power source, and the switching circuit and the controller configured and arranged to monitor the primary voltage and the primary current and to provide the control signal in the event that the primary voltage and the primary current falls below a level necessary to power the electric vehicle for the switching circuit to connect the secondary power source; and a recharging system coupled to the primary power source and the secondary power source and an external power supply for providing a charging current for the primary and secondary power sources.

2. The power supply of claim 1 wherein the recharging system comprises:

a charge current regulation circuit for maintaining a power supply charge current at an essentially constant rate during a recharging operation and comprising:

a current surge limiter coupled to said external power supply and coupled to said primary power source, said active current surge limiter to limit said charge current when said charge voltages are near to a full discharge and to furnish most of said charge current when said charge voltages are near to a full charge.

3. The power supply of claim 2, wherein the recharging system further comprises a DC-to-DC converter in parallel with said active current surge limiter to furnish most off said charge current when said charge voltages are near to said full discharge.

4. The power supply of claim 2 wherein said recharging station includes an input device sized and configured to mate to an output device of a recharging station generating said charge current.

5. The power supply of claim 1 wherein said current surge limiter is an active current surge limiter.

6. The power supply of claim 1, wherein each one of said plurality of cells of said ultracapacitor assembly includes a cell voltage equalizer comprising:

an over-voltage detection circuit for detecting a cell over-voltage exceeding a maximum allowable cell voltage.

7. The power supply of claim 1, wherein each one of said plurality of cells of said ultracapacitor assembly includes a discharge circuit to reduce said cell over-voltage to a level below said maximum allowable cell voltage.

8. The power supply of claim 1, wherein each one of said plurality of cells of said ultracapacitor assembly includes a reporting circuit to report said over-voltage to control circuitry of said vehicle.

9. The power supply of claim 1 further including a dc/dc converter coupled to said switching device and to said engine, said dc/dc converter to receive current from said switching device and to provide power to the engine.

10. The power supply of claim 1 wherein the secondary power source comprises a battery having one or more battery cells, each of said one or more battery cells holding a charge.

11. The power supply of claim 10 wherein the battery is a rechargeable battery.

12. The power supply of claim 1 wherein the secondary power source comprises a second ultracapacitor having one or more ultracapacitor cells, each of said one or more ultracapactor cells holding a charge.

13. A power supply for furnishing direct current (DC) power to an engine of an electric vehicle, said power supply mounted on said electric vehicle and comprising:

a primary ultracapacitor power source generating a primary output voltage and a primary output current used to power the motor of the electric vehicle, the primary ultracapacitor power source comprising an ultracapacitor assembly having a plurality of ultracapacitor cells, each of said plurality of ultracapacitor cells holding a charge having a voltage, said primary power source to provide power to said engine;

a recharging system coupled to the primary power source and an external power supply for providing a charging current for the primary power source.

14. The power supply of claim 13 further comprising a secondary power source generating a secondary output voltage and a secondary output current;

a switching device connected to said primary and secondary power sources and selecting in response to a control signal either, or both, of said power sources to provide power to said engine;

a controller coupled to the primary power source, the secondary power source, and the switching device and providing the control signal for the switching device.

15. The power supply of claim 14 wherein said secondary power source comprises a rechargeable battery having one or more battery cells, each of said one or more battery cells holding a charge and having a voltage, said secondary power source being coupled to said recharging system to receive recharging current for said rechargeable battery.

16. The power supply of claim 14 wherein said recharging system comprises:

a charge current regulation circuit for maintaining a power supply charge current at an essentially constant rate during a recharging operation and comprising:

an active current surge limiter coupled to said external power supply and coupled to said primary power source, said active current surge limiter to limit said charge current when said charge voltages are near to a full discharge and to furnish most of said charge current when said charge voltages are near to a full charge.

17. The power supply of claim 16, wherein the recharging system further comprises a DC-to-DC converter in parallel with said active current surge limiter to furnish most off said charge current when said charge voltages are near to said full discharge.

18. The power supply of claim 13, wherein each one of said plurality of cells of said ultracapacitor assembly includes a cell voltage equalizer comprising:

an over-voltage detection circuit for detecting a cell over-voltage exceeding a maximum allowable cell voltage.

19. The power supply of claim 13, wherein each one of said plurality of cells of said ultracapacitor assembly includes a discharge circuit to reduce said cell over-voltage to a level below said maximum allowable cell voltage.

20. The power supply of claim 13, wherein each one of said plurality of cells of said ultracapacitor assembly includes a reporting circuit to report said over-voltage to control circuitry of said vehicle.

21. The power supply of claim 13 further including a dc/dc converter coupled to said switching device and to said engine, said dc/dc converter to receive current from said switching device and to provide power to the engine.

* * * * *